United States Patent [19]

Pasternak

[11] Patent Number: 4,459,585

[45] Date of Patent: Jul. 10, 1984

[54] TELEVISION RECEIVER IDENTIFICATION SYSTEM

[75] Inventor: Eliezer Pasternak, 1142 Olive Village Ct., Olivette, Mo. 63132

[73] Assignees: Eliezer Pasternak, Olivette, Mo.; Yoel Gat, Saba, Israel; Moshe Balter, Tel Aviv, Israel; Ehud Guth, Jerusalem, Israel; Schneitzer Industries, Ltd., Holon, Israel; a part interest

[21] Appl. No.: 335,233

[22] Filed: Dec. 28, 1981

[51] Int. Cl.³ .............................................. G09G 1/00
[52] U.S. Cl. ..................................... 340/721; 358/22; 358/183; 340/720; 340/744
[58] Field of Search .......................... 358/22, 181, 183; 340/721, 744, 720, 745, 723

[56] References Cited

U.S. PATENT DOCUMENTS 3,868,675  2/1975  Firmin ................................. 340/802
4,344,090  8/1982  Belisomi ............................. 358/183

Primary Examiner—Marshall M. Curtis
Attorney, Agent, or Firm—Paul M. Denk

[57] ABSTRACT

A television receiver identification system including a picture generator for providing display of symbols useful for identifying information relating to the set's ownership, or the like, the identification system including circuitry having a central storage where the data may be input and retained within the system, an interface between the central storage and the horizontal and vertical pulse generating circuitry of the television receiver picture generator, circuitry provided within the picture generator for pulsing the stored identification signal to the receiver's cathode ray tube for displaying momentarily the identification information regarding the set's ownership.

7 Claims, 3 Drawing Figures

TELEVISION RECEIVER IDENTIFICATION SYSTEM

REFERENCE TO RELATED APPLICATION

This application is related to and was filed in the Israeli Patent Office on Jan. 1, 1981, under Ser. No. 61816.

BACKGROUND OF THE INVENTION

This invention is concerned with security systems and more particularly with television receiver identification systems for use in deterring the theft of television receivers and/or for enabling the location of the owners of stolen television sets. Thus the inventive system is designed to deter thieves from stealing television sets that are registered in the system of the invention.

The theft of items such as television sets which are extremely expensive in Israel has grown by leaps and bounds. Many of the stolen television sets reportedly turn up in the retail stores where they are sold as new sets. There is no way of tracing the television sets to their rightful owners even when they are recovered by the police.

To prevent the theft of items such as television sets the Israeli citizen has taken to buying complicated lock systems for preventing the entry of burglars. In addition, to minimize the losses of stolen items the Israeli citizen purchases costly insurance. Nonetheless burglaries continue and the victims of such burglaries are not only damaged through the loss of money; but also are severely inconvenienced since even if they have insurance covering their losses they still must go to the store and take the time for purchasing and replacing the stolen items.

One of the reasons television sets are such good targets for burglars is that they are readily marketable. Thus there is a long felt need for means and methods for deterring burglars from taking items such as television sets by making the stolen television sets less marketable. The problem has grown as the television sets have become more sophisticated and complicated, i.e. color set and television recording systems have made the television receivers a juicier target for burglary.

Some means to inhibit the sale of the stolen T.V. receivers have been attempted. Among these means are name plates with identifying serial numbers and also the etching of serial numbers on the chassis. While these simple devices do deter some burglars they are too simple to remove and therefore do not provide much of a deterrent. A combination of identifications systems is therefore required.

For example with merely etching or attaching a serial number to a set and relying on the retail store to maintain some kind of record of who the set is sold to is too unreliable. Retail stores are interested in selling the set and then attending to the next customer to sell the next set. Thus, the marking of the television sets without a registration system has not proven to be satisfactory for detering burglaries.

Accordingly it is an object of the present invention to provide new improved television receiver identification systems for deterring burglaries in which the above referred to disadvantages are substantially reduced or overcome.

According to the present invention a television receiver identification means is provided which comprises means fixedly attached to the television receiver providing unique identifying symbol means along with picture generating means for causing at least some of said identifying symbols to be displayed on the cathode ray tube of said television receiver.

Thus when the television set is turned on, for example, the picture tube displays the name and serial number of the owner. A further feature of the present invention is to have this name and serial number registration centrally stored as a service by either the television manufacturing company or a service company providing a central storage memory containing the serial numbers of the registered television sets along with the owner identification and location.

A feature of the present invention is that to facilitate the central storage the picture generating means includes programmable memory means whereby the information can be readily changed by the central storage company if and when the set is legally transferred.

A further feature of the invention provides outlet circuitry connecting the programmable memory to the cathode ray tube control circuits for causing a display of the name of the owner and the registered number of the television set.

Yet another feature of the invention enables the operation of the picture generating means and the display in the picture for a fixed time period. Thus, for example, when the owner turns on the set, the information is displayed for a fixed time period, thereafter it is not displayed and thereby does not interfere with the operation and enjoyment of the television receiver.

Yet another feature of the invention is the provision for operating the identifying display responsive to the operation of a special switch whereby the display can be provided during the operation of the television set or at any time desired.

The operation and utilization of the present invention will be more apparent from the description of a preferred embodiment taken in conjunction with the accompanying drawings.

SUMMARY OF THE INVENTION

This invention relates to a television receiver identification system wherein its picture generator means can be energized for causing at least some identification symbols stored within the identification system of the receiver to be displayed momentarily upon its cathode ray tube. The identification system includes a central storage means that includes its own circuitry within the receiver, and said central storage means stores data relating to that information desired to be identified upon the picture generator. An interface means is electrically coupled between the central storage means and the television receiver cathode ray tube, that is provided for conducting the wide horizontal and narrow vertical pulses normally generated in the television receiver to the said picture generating means. Electrical means are provided within the picture generator means for adapting the said pulses to provided signals for causing at least some of the identifying symbols to be displayed upon the cathode ray tube of the said receiver. Said picture generating means includes a memory means for providing a plurality of picture varying signal outputs responsive to the addresses in the memory, with said memory means comprising a read-only memory. The means for addressing the said memory means includes first and second counter means, each providing for respectively conducting horizontal and vertical address signals to the memory means, and which signals are conducted to an oscillator means for providing for the generation of the tube displaying signals and the identifying symbols.

DESCRIPTION OF THE PREFERRED EMBODIMENT

Figure 1:
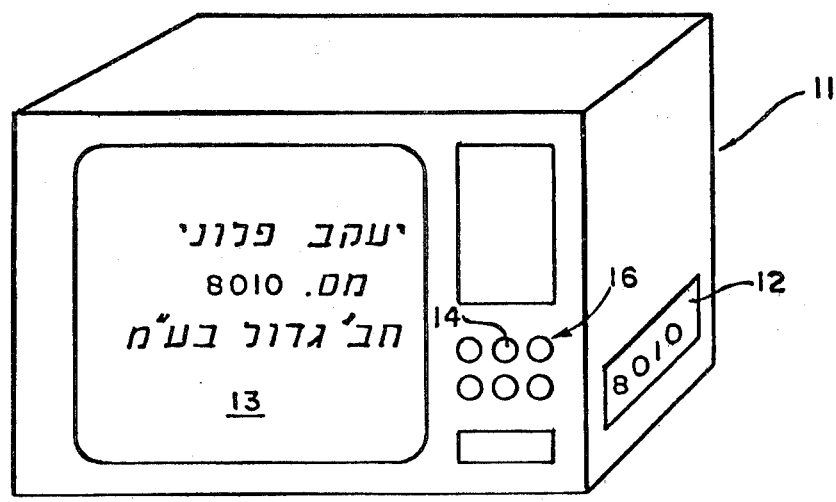
FIG. 1 is a pictorial showing of a television receiver with the display information shown on the cathode ray tube thereof.

The television receiver 11 shown in FIG. 1 is equipped with an identification system designed to deter thefts. On the side of the set 11, for example, is a name plate 12 having identifications numbers shown as 8010. The numbers etched into the side of the set or glued thereon in a manner such that the removal of the identification number would cause the finish of the set to be marred. It should be understood that ideally the information will be attached to the front of the set so as to be visible even when the et is mounted in a shelf arrangement with the sides covered. In addition the numbers would be put on the CRT using a diamond.

In addition to the numbers 12 shown, the symbol of the company which provides a central registration could also be displayed. Such a showing would indicate to a potential burglar that the set is fully identified and the indentification is fully registered.

The television set 11 is shown after being turned on with an identifying display on the cathode ray tube 13 of the set. The display could take any convenient form However, in a preferred embodiment it includes the name of the owner which is shown in the first line of the display, the registration number and the name of the company that is providing the registration service. The display can either be shown when the television set is first turned on, using the on/off control 14 or could be turned on at any time using the control 16 which is used solely for showing the identifying display.

Figure 2:
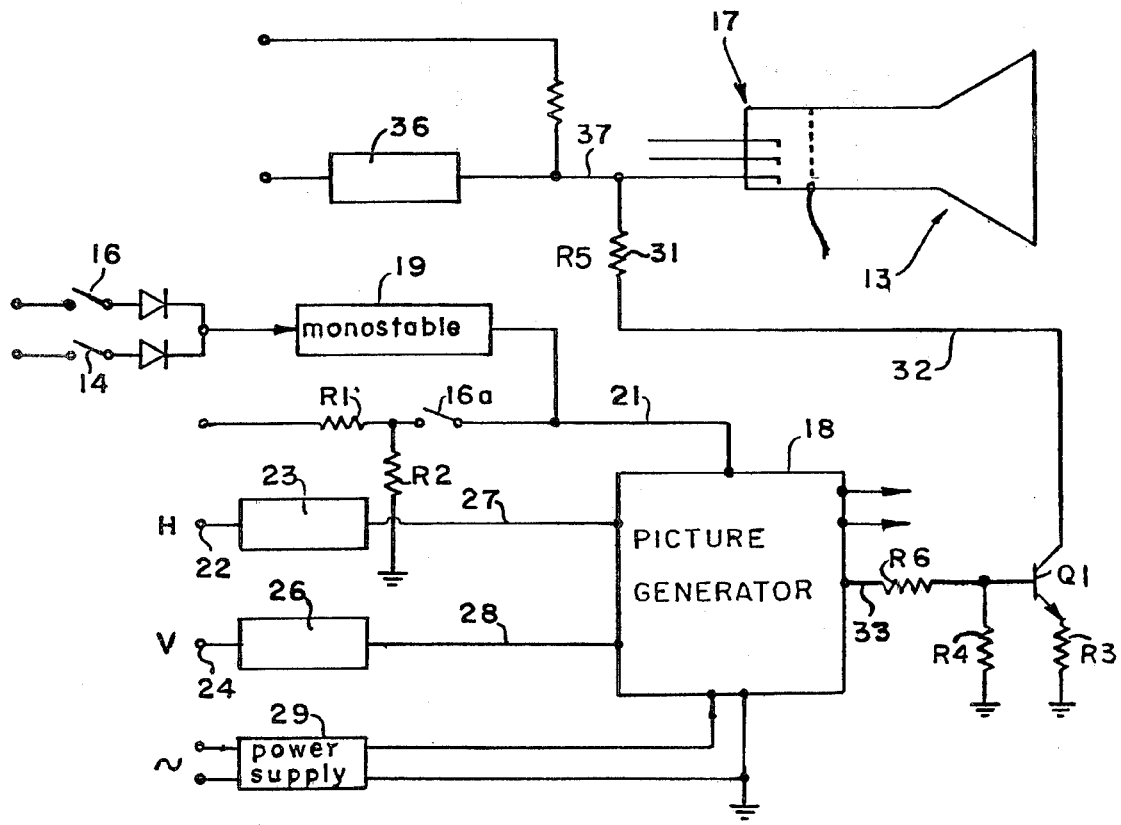
FIG. 2 is a block diagram showing of circuitry providing the display shown in FIG. 1.

The block diagram of FIG. 2 shows the major component parts necessary for the display of the identifying symbols. More particularly the CRT 13 is depicted with its electrodes for controlling the colors blue, green and red generally shown at 17. A picture generator circuit is shown generally at 18. The function of the picture generator, of course is to provide the display or picture of the symbols used for identification purposes as shown on the CRT in FIG. 1.

Means are provided for generating a signal to enable the picture generator 18. More particularly there is shown a monostable circuit 19 which is operated either responsive to turning on the set or responsive to a separate manually operated switch 16 shown in FIG. 1.

The monostable circuit 19 provides an ENABLE signal on conductor 21 for the time period determined by the monostable. Alternatively, a switch 16a may be provided to enable the picture generator for as long as the switch is closed. The switch is shown as connecting power through a divider circuit comprising resistor R1 and R2 to the ENABLE input of along current line 49 of the picture generator 18.

The normal horizontal signal of the television is coupled from point 22 through interface circuit 23. Similarly the vertical signal is connected from point 24 through another interface circuit 26 to the picture generator 18. The picture generator 18 when enabled operates responsive to the horizontal and vertical signals when received from the interface circuits 23, 26 over conductors 27 and 28, respectively.

The power for the picture generator can be supplied by the power supply of the television set or in the preferred embodiment an independent power supply 29 is supplied as part of the circuitry that is attached to the television set for identification purposes. The power supply 29 is shown as connected to the line derived AC power and provides the necessary DC power.

The output of the picture generator 18 is shown as comprising three outputs; one for controlling each of the color electrodes. One of the outputs is shown connected to the electrodes of CRT 13. Normally the power supplied to the picture tube cause variations on the anodes and cathodes of the tube so that the face of the CRT shows a picture. The particular variations on the tube for displaying the identification information are made responsive to the output of the picture generator using such components as transistor Q1. The collector of transistor Q1 is shown as being coupled to a cathode of CRT 13 through resistor R5 and conductor 32. When the proper signals from the picture generator are supplied over conductor 33 the base is biased to switch transistor Q1 to its conducting state. The transistor Q1 conducts from the cathode or CRT 13, through resistor R5, or 31, conductor 32, transistor Q1 and emitter resistor R3 to ground. Biasing resistor R4 is shown connected to the base of the transistor. Biasing resistor R4 operates in conjunction with resistor R6 in a voltage divider network arrangement for further control of the identification picture shown on the cathode ray tube.

A block marked as 36 depicts the controls in the television set for controlling the signal on the cathode through conductor 37 to which the output of the picture generator is shown connected. The circuit 36 is, for example, a color module controlling the red, green and blue inputs. It should be understood that there may be similar connections through the other two electrodes, as shown, in addition to the connection to the cathode 17 through the conductor 37 from the picture generator for providing the complete identifying display shown in FIG. 1.

Figure 3:
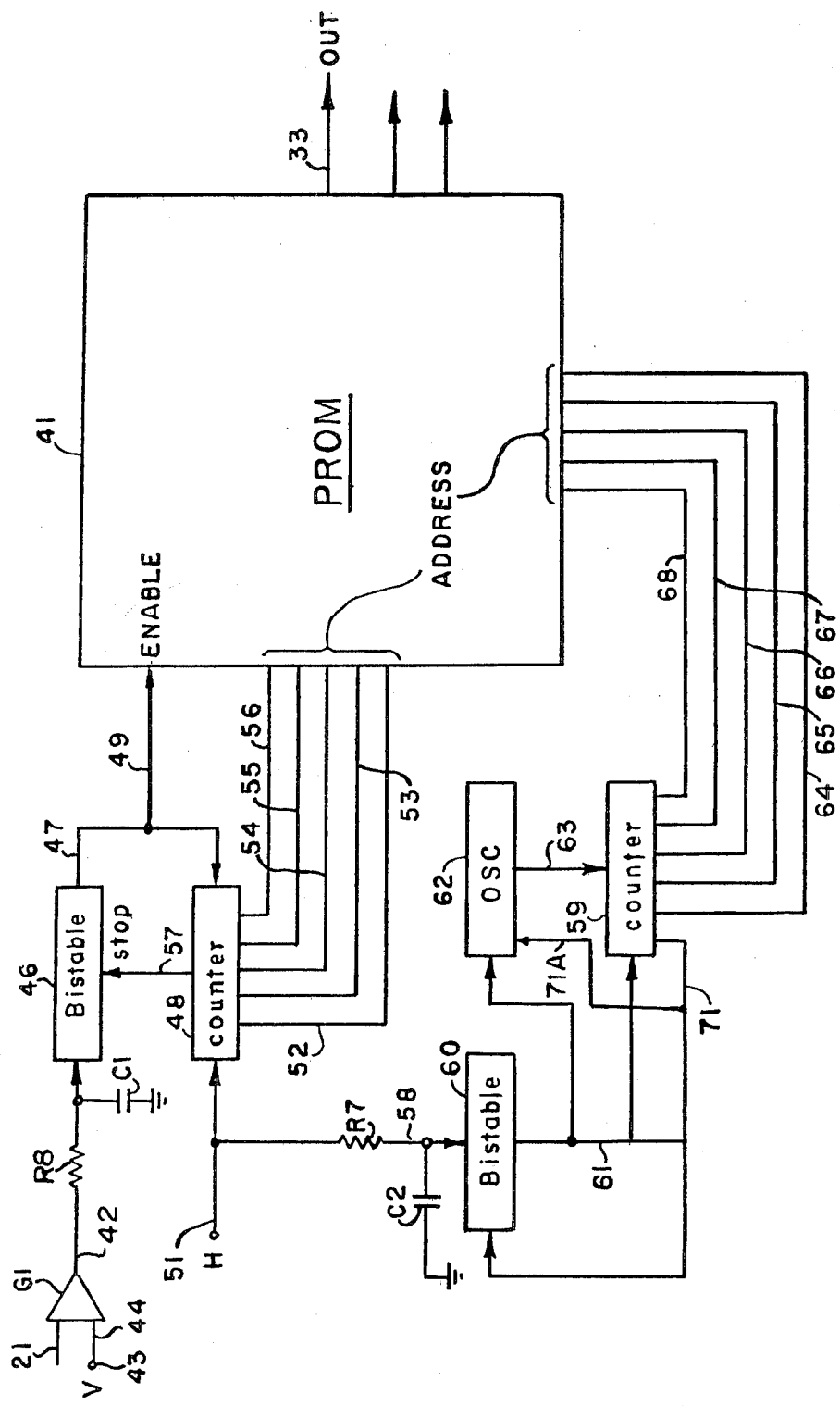
FIG. 3 is a block diagram showing of a preferred embodiment of the functional components used in the picture generator of FIG. 2.

Details of the picture generator circuit are shown in FIG. 3. As shown therein, the heart of the picture generator circuit is a programmable read only memory 41. The memory circuit is enabled, for example, by the signal from monostable 19 on conductor 21. More particularly the enable signal on conductor 21 is supplied to one input of the gate G1. The other input to the gate is a vertical signal from the television receiver which is picked up at point 43 and supplied to the gate G1 over conductor 44. Thus gate G1 is operated upon the simultaneous receipt of high signals on conductors 21 and 44. The output of gate G1 is supplied to a start or reset terminal of delay means such as flip-flop (bistable) circuit 46 through the conductor 42 and resistor R8. A capacitor C1 services as a filter at the input to the bistable circuit. Capacitor C1 is coupled between the input of the bistable 46 and the ground. The output of the bistable 46 is carried over conductor 47 to the reset input of a counter circuit 48. In a preferred embodiment counter 48 is a binary ripple counter. The output of the bistable is also carried through conductor 49 to enable the programmable read only memory 41.

The vertical signal merely operates the bistable circuit 46 which provides the start signal for the counter 48 and enables the memory to provide output signals. Horizontal signals are transferred via conductor 51 to a count terminal of the counter. Every individual horizontal signal steps the counter one step providing outputs at conductor 52-56. It should be noted that the counter 48 is shown as having five outputs, however as many outputs as are required can be provided. Each of the counter outputs are connected to the programmable read only memory and serve as an address for the portions of the picture to be varied to make up the identification display shown in FIG. 1. At the last step of the counter a signal is transferred to the bistable 46 over conductor 57 to stop or turn off the bistable.

Simultaneously with the horizontal address a vertical address is also provided by the horizontal signal. More particularly yet another bistable circuit 60 is also connected to conductor 51 through conductor 58 in series with resistor R7 to thereby reset or enable circuit 60. A bridging filter capacitor C2 is provided at the enable input of bistable circuit. The output signal of the bistable 60 is used to enable a second counter 59 through conductor 61. However counter 59 does not count or step responsive to horizontal signals, instead it counts the pulses of a separate timer or oscillator 62 which is connected to the count input of the counter through conductor 63. The counter 59 in a preferred embodiment is a binary synchronous counter. The oscillator in a preferred embodiment operates at 1.2 mHz.

The pulses of te oscillator steps the counter through a vertical address at the programmable read only circuit 41 through conductors 64–68. The output 71 which follows output 68 is used to turn off the oscillator and switch bistable 60.

At each corresponding vertical and horizontal address, a signal is provided at the output of the programmable read only memory to circuitry such as that shown in FIG. 2. The vertical and horizontal signals received after the bistables 46 and 60 are stopped reset the bistables and the subsequent vertical and horizontal signals are again used to operate the counters to address the programmable read only memory.

Using the programmable read only memory enables registration of the television sets at a central location. For example when the owner of the television set signs up with the registration company his set is provided with the circuitry as described herein. The information is then displayed on his television screen and centrally registered. If and when the owner sells his set, it is a simple matter for the registration company to change the program of the memory to show a new owner and register the new owner. The registration of the set will be known to the public because of, for example, a large advertising publicity campaign and this in itself will act to deter burglars and thieves from taking sets equipped as described herein.

In the preferred embodiment the following typical components were used:

| Component | Dwg. No. | Supplier | No. |
| --- | --- | --- | --- |
| PROM | 41 | Intel | 2716 |
| Monostable | 19 | RCA | CD 4013Bl |
| Bistable | 46 | RCA | CD 4013Bl |
| Bistable | 60 | RCA | CD 4013Bl |
| Counter | 48 | RCA | CD 4040Bl |
| Counter | 59 | Solid State | SCL 4404N |

-continued

| Component | Dwg. No. | Supplier | No. |
| --- | --- | --- | --- |
| Osc. | 62 | Scientific RCA | CD 4047B |

In operation, then, the programmable read only memory is provided with a program thereby responsive to operation of either the on/off switch 14 or the switch 16 of the output of the programmable read only memory and acts to provide a picture showing identification information that is specific to the owner of the set.

While the principles of the invention have been described above in connection with specific apparatus and application, it is to be understood that the description is made by way of example only and not as a limitation on the scope of the invention.

Having thus described the invention what is claimed and desired to be secured by Letters Patent is:

1. A television receiver identification system having a cathode ray tube and comprising, a picture generator means for causing at least some of the identification symbols permanently stored in the identification system to be displayed momentarily on the cathode ray tube of the television receiver system, said receiver incorporating interface means, said receiver also including central storage means, said interface means electrically coupled between the central storage means and the television receiver cathode ray tube and being provided for conducting the horizontal and vertical pulses normally generated in the television receiver to the said picture generator means, electrical means provided in said picture generator means for adapting the said pulses to provide signals for causing at least some of the identification symbols to be displayed upon the cathode ray tube of the television receiver, said picture generator means including memory means providing a plurality of picture varying signal outputs responsive to addresses in said memory, means for addressing these said memory means, and said memory means being a programmable read-only memory.

2. The invention of claim 1 and including means fixably attached to the outside of the television receiver for providing a permanant display of identifying information regarding the receiver's ownership.

3. The invention of claim 1 and wherein said means for addressing the said memory means includes a first counter means for providing horizontal address signals to the said memory means responsive to said horizontal signals, second counter means for providing vertical address signals to said memory means, electronic means provided for operation of these said first and second counter means responsive to said vertical signals and horizontal signals respectively, and oscillator means provided for counting signals to the said second counter means.

4. The invention of claim 3 and wherein said means for initiating the operation of said first and second counter means comprising first and second bistable circuits respectively.

5. The invention of claim 8 and including circuit means provided for coupling the said picture varying signals to the electrodes of the cathode ray tube.

6. The invention of claim 5 and including means provided for initiating the operation of said identification system responsive to a turn-on of the said television receiver.

7. The invention of claim 6 and including circuit means providing for initiating the said identification system responsive to a separate on-off switch means of the said television receiver.

* * * * *

UNITED STATES PATENT AND TRADEMARK OFFICE
CERTIFICATE OF CORRECTION

PATENT NO. : 4,459,585
DATED : 07/10/84
INVENTOR(S) : Pasternak, Eliezer

It is certified that error appears in the above—identified patent and that said Letters Patent is hereby corrected as shown below:

In Claim 5 change #8 to ---4---.

Signed and Sealed this

Thirteenth Day of November 1984

[SEAL]

Attest:

Attesting Officer

GERALD J. MOSSINGHOFF

Commissioner of Patents and Trademarks